US010824020B2

(12) United States Patent
Lin et al.

(10) Patent No.: US 10,824,020 B2
(45) Date of Patent: Nov. 3, 2020

(54) POLARIZATION INDEPENDENT OPTICAL PHASE MODULATOR

(71) Applicant: National Chiao Tung University, Hsinchu (TW)

(72) Inventors: Yi-Hsin Lin, Zhubei (TW); Hung-Chun Lin, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 128 days.

(21) Appl. No.: 16/001,138

(22) Filed: Jun. 6, 2018

(65) Prior Publication Data

US 2019/0121204 A1 Apr. 25, 2019

(30) Foreign Application Priority Data

Oct. 20, 2017 (TW) .............................. 106136183 A

(51) Int. Cl.
*G02F 1/1337* (2006.01)
*G02F 1/1343* (2006.01)

(52) U.S. Cl.
CPC .. *G02F 1/133753* (2013.01); *G02F 1/134309* (2013.01); *G02F 2001/133738* (2013.01); *G02F 2001/133757* (2013.01); *G02F 2201/122* (2013.01); *G02F 2203/06* (2013.01); *G02F 2203/50* (2013.01)

(58) Field of Classification Search
None
See application file for complete search history.

(56) References Cited

U.S. PATENT DOCUMENTS

| 5,602,661 | A | * | 2/1997 | Schadt | .................. | C08F 246/00 349/117 |
| 5,638,201 | A | * | 6/1997 | Bos | .................... | G02F 1/133753 349/128 |
| 5,825,448 | A | * | 10/1998 | Bos | .................... | G02F 1/133753 349/128 |
| 5,973,817 | A | | 10/1999 | Robinson et al. | | |

(Continued)

OTHER PUBLICATIONS

Y. H. Lin and Y. S. Tsou, "A polarization independent liquid crystal phase modulation adopting surface pinning effect of polyer dispersed liquid crystals" J. Appl. Phys. 110, 114516 (2011).

(Continued)

*Primary Examiner* — Edward J Glick
*Assistant Examiner* — David Y Chung
(74) *Attorney, Agent, or Firm* — TraskBritt

(57) ABSTRACT

A polarization independent optical phase modulator includes two substrates, two electrode layers, two alignment layers, and a liquid crystal layer. Each of alignment layers has first and second alignment regions each having a predetermined width in a transverse direction, which is not greater than a half of the wavelength of an incident light. In the liquid crystal layer, two adjacent ones of liquid crystal elements in the transverse direction are aligned respectively by two adjacent ones of the first and second alignment regions in two predetermined orientations which are orthogonal to each other, thereby permitting phase modulation of the incident light to be independent of the polarization of the incident light.

8 Claims, 5 Drawing Sheets

(56) References Cited

U.S. PATENT DOCUMENTS

| | | | |
|---|---|---|---|
| 7,471,362 B1* | 12/2008 | Jones | G02F 1/133753 |
| | | | 349/123 |
| 8,570,460 B2 | 10/2013 | Gu et al. | |
| 2015/0293353 A1* | 10/2015 | Chin | G02B 27/0075 |
| | | | 349/123 |
| 2016/0097948 A1* | 4/2016 | Chin | G02B 3/14 |
| | | | 349/33 |

OTHER PUBLICATIONS

Y. H. Lin, H. Ren, Y. H. Fan, Y. H. Wu, and S. T. Wu, "Polarization-independent and fast-response phase modulation using a normal-mode polymer-stabilized cholesteric texture" J. Appl. Phys. 98, 043112 (2005).

H. Ren, Y. H. Lin, C. H. Wen, and S. T. Wu, "Polarization-independent phase modulation of a homeotropic liquid crystal gel" Appl. Phys. Lett. 87, 191106 (2005).

H. Ren, Y. H. Lin, Y. H. Fan, and S. T. Wu, "Polarization-independent phase modulation using a polymer-dispersed liqud crystal" Appl. Phys. Lett. 86, 141110 (2005).

H. Ren, Y. H. Lin and S. T. Wu, "Polarization-independent and fast-response phase modulators using double-layered liquid crystal gels" Appl. Phys. Lett. 88, 061123 (2006).

S. Aya, K. V. Le, F. Araoka, K. Ishikawa, and H. Tkezoe, "Nanosize-induced Optically Isotropic Nematic Phase" Jpn. J. Appl. Phys. 50, 051703 (2011).

W. Hu, A. K. Srivastava, X. Lin, X. Liang, Z. Wu, J. Sun, G. Ahu, V. Chigrinov, and Y. Lu,"Polarization independent liquid crystal gratings based on orthogonal photoalignments" Appl. Phys. Lett. 100, 111116 (2012).

* cited by examiner

POLARIZATION INDEPENDENT OPTICAL PHASE MODULATOR

CROSS-REFERENCE TO RELATED APPLICATION

This application claims priority from Taiwanese invention patent application no. 106136183, filed on Oct. 20, 2017.

FIELD

The disclosure relates to a polarization independent optical phase modulator, more particularly to a polarization independent optical phase modulator including a liquid crystal layer.

BACKGROUND

U.S. Pat. No. 8,570,460 B2 discloses a liquid crystalline optical medium which includes polymer stabilized liquid crystal material. The polymer stabilized liquid crystal material includes a short pitch cholesteric liquid crystal material stabilized by a polymer material. The effective phase retardation of the polarization independent liquid crystal optical medium can be controlled by external field.

A polarization-independent phase-only liquid crystal (LC) phase modulator using a double-layered structure is disclosed by Yi-Hsin Lin et al. in a paper entitled "Polarization-independent liquid crystal phase modulator using a thin polymer-separated double-layered structure," vol. 13, no. 22/OPTICS EXPRESS 8746 (2005).

SUMMARY

An object of the disclosure is to provide a novel polarization independent optical phase modulator in which a single liquid crystal layer is used.

According to the disclosure, a polarization independent optical phase modulator is provided for phase modulation of an incident light having a wavelength. The polarization independent optical phase modulator includes a first substrate, a second substrate, a first electrode layer, a second electrode layer, a first alignment layer, a second alignment layer, and a liquid crystal layer. The first and second substrates are spaced apart from each other along a line normal to the first and second substrates. At least one of the first and second substrates is light-transmissive. The first and second electrode layers are respectively formed on the first and second substrates. The first and second alignment layers are respectively formed on the first and second electrode layers to define a filling space therebetween. Each of the first and second alignment layers has a plurality of first alignment regions and a plurality of second alignment regions. The first alignment regions extend respectively in a longitudinal direction, and are displaced from each other by a predetermined width in a transverse direction relative to the longitudinal direction. The second alignment regions extend respectively in the longitudinal direction, and are disposed to alternate the first alignment regions. The second alignment regions have a different alignment pattern from that of the first alignment regions. Each of the first and second alignment regions has the predetermined width in the transverse direction, which is not greater than a half of the wavelength. The liquid crystal layer has a plurality of liquid crystal elements which are filled in the filling space and which are aligned by the first and second alignment layers such that two adjacent ones of the liquid crystal elements in the transverse direction are aligned respectively by two adjacent ones of the first and second alignment regions in two predetermined orientations which are orthogonal to each other, thereby permitting the phase modulation of the incident light to be independent of the polarization of the incident light.

BRIEF DESCRIPTION OF THE DRAWINGS

Other features and advantages of the disclosure will become apparent in the following detailed description of the embodiment (s) with reference to the accompanying drawings, in which.

DETAILED DESCRIPTION

Figure 1:
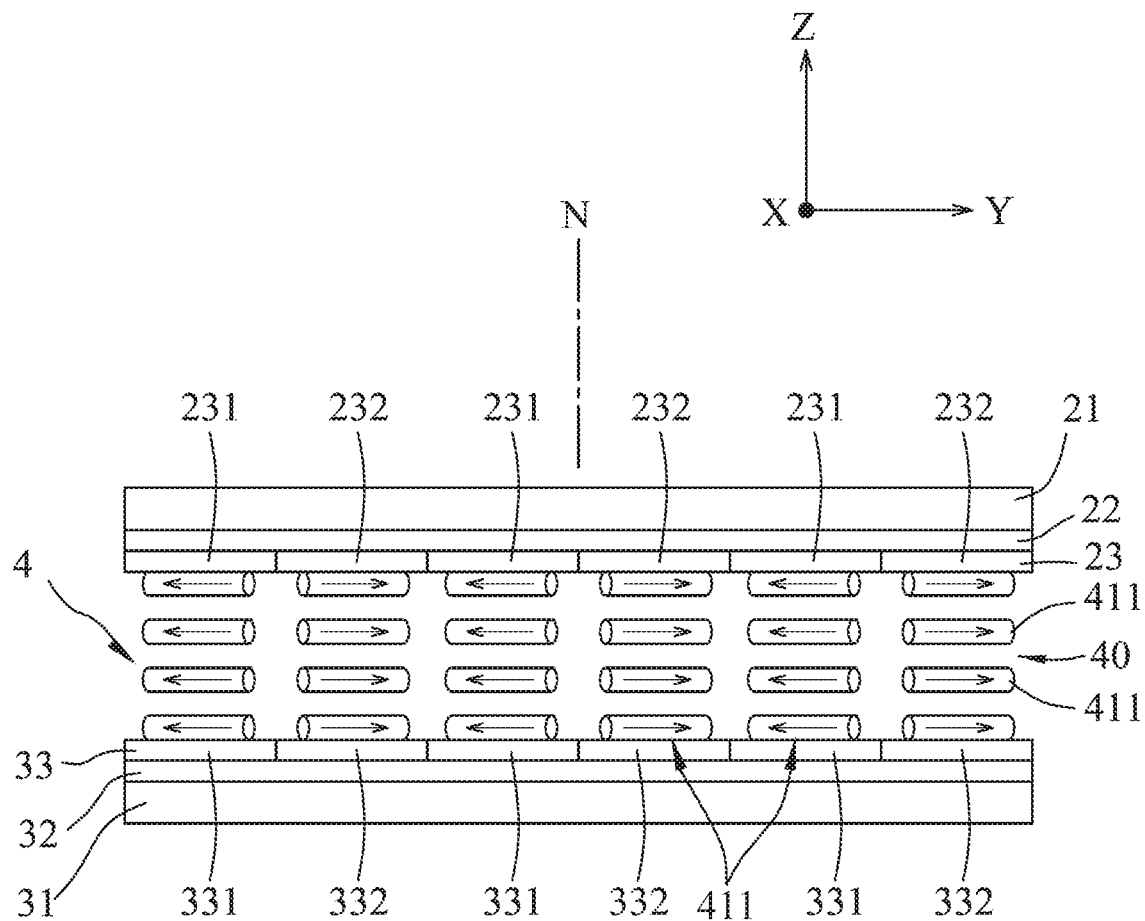
FIG. 1 is a side view of a polarization independent optical phase modulator according to a first embodiment of the disclosure.

Before the disclosure is described in greater detail, it should be noted that where considered appropriate, reference numerals have been repeated among the figures to indicate corresponding or analogous elements, which may optionally have similar characteristics.

It should be noted that the drawings, which are for illustrative purposes only, are not drawn to scale, and are not intended to represent the actual sizes or actual relative sizes of the components of the polarization independent optical phase modulator.

Figure 2:
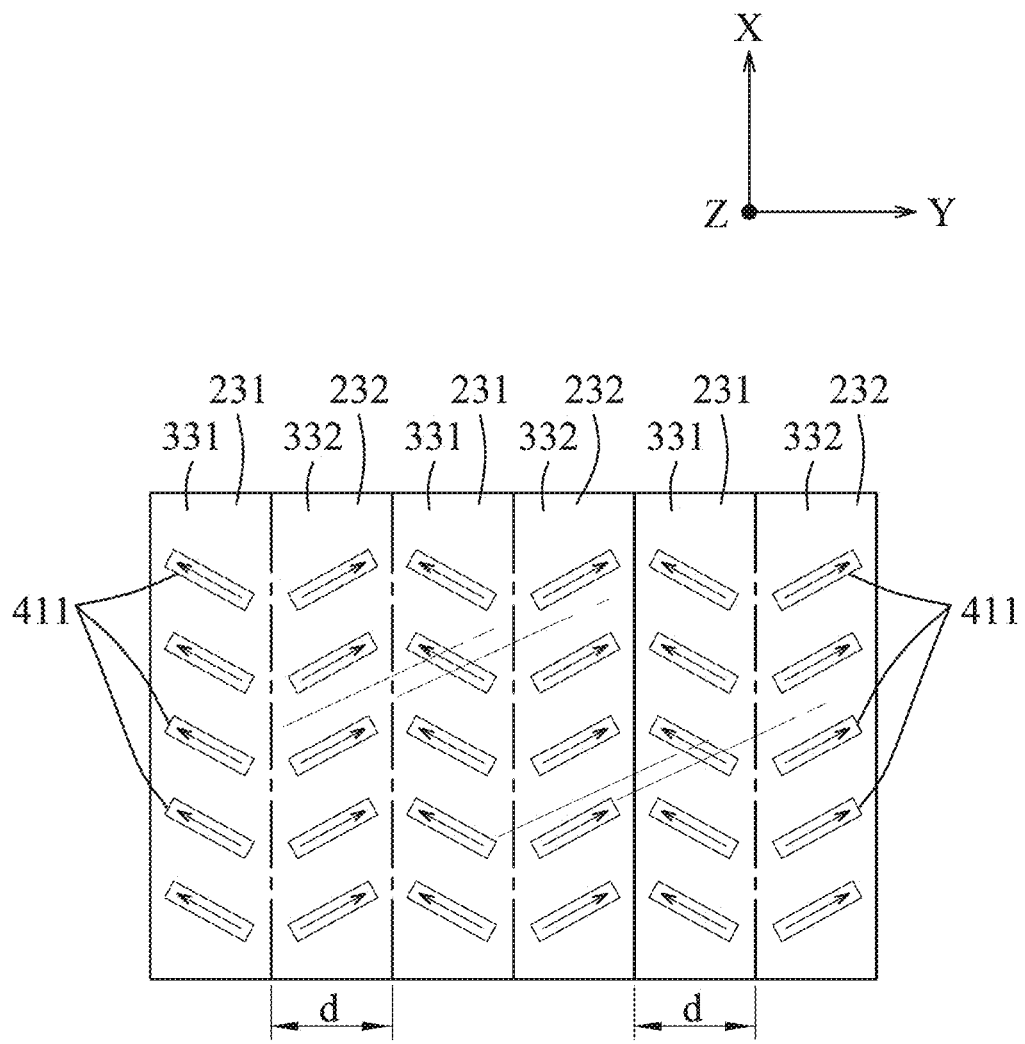
FIG. 2 is a top view of the polarization independent optical phase modulator shown in FIG. 1.
Figure 3:
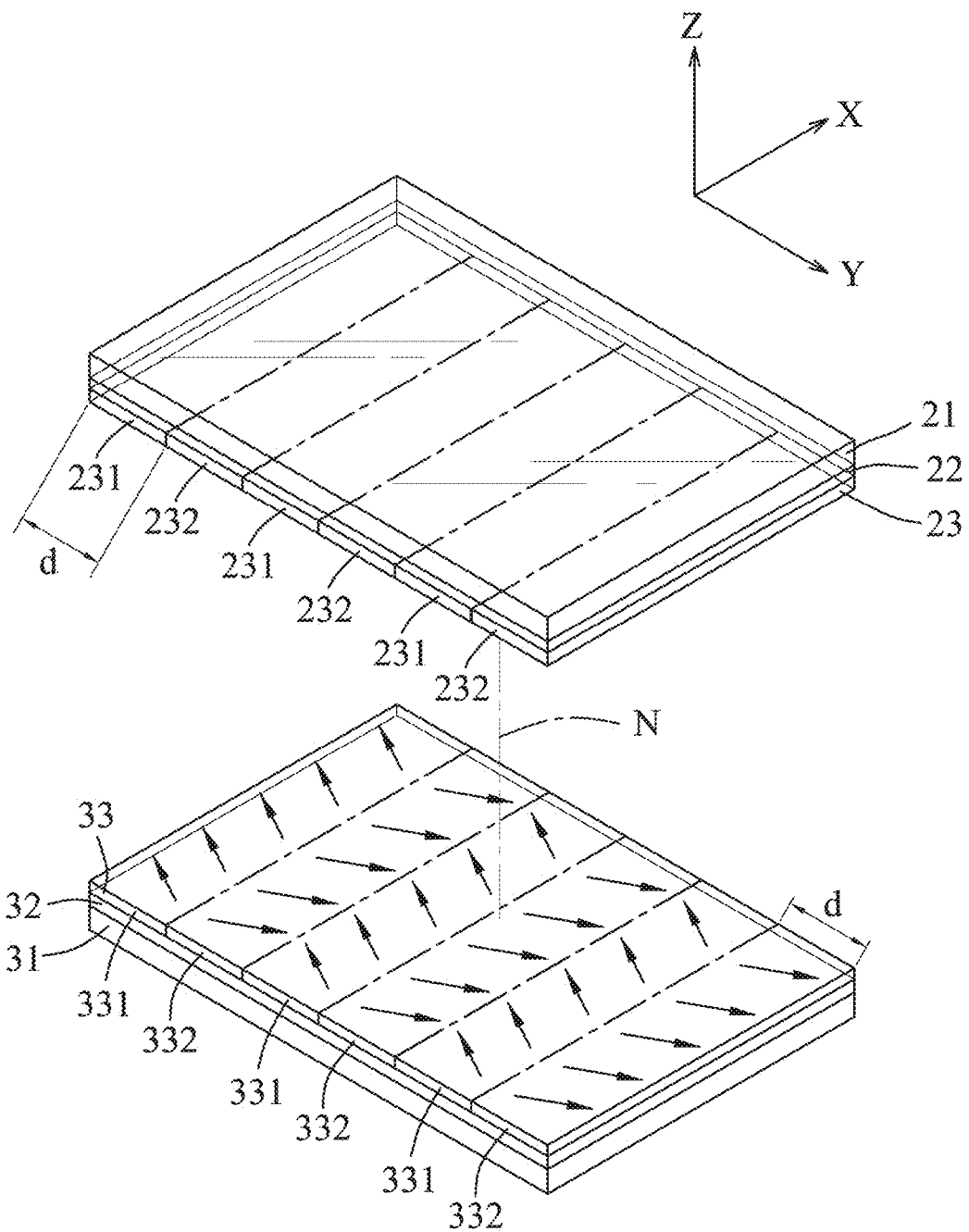
FIG. 3 is an exploded perspective view of the polarization independent optical phase modulator of FIG. 1, in which a liquid crystal layer is omitted.

As shown in FIGS. 1 to 3, a polarization independent optical phase modulator is provided for phase modulation of an incident light having a wavelength. The polarization independent optical phase modulator includes a first substrate 21, a second substrate 31, a first electrode layer 22, a second electrode layer 32, a first alignment layer 23, a second alignment layer 33, and a liquid crystal layer 4.

In this specification, "polarization independent" means that phase modulation is not influenced by the polarization of the incident light. The polarization of the incident light is not altered by the polarization independent optical phase modulator.

The polarization independent optical phase modulator may be applied to the fields of holography, adaptive optics, liquid crystal lens, etc.

The first and second substrates 21, 31 are spaced apart from each other along a line (N) normal to the first and second substrates 21, 31. At least one of the first and second substrates 21, 31 is light-transmissive. In an embodiment, each of the first and second substrates 21, 31 is light-transmissive, and may be made from glass, light-transmissive polymer materials, etc.

The first and second electrode layers 22, 32 are respectively formed on inner surfaces of the first and second substrates 21, 31. In an embodiment, each of the first and second electrode layers 22, 32 is light-transmissive, and may be made from indium tin oxide (ITO), indium zinc oxide (IZO), silver nanowires, a layer of metal mesh, PEDOT:PSS or the combination.

The first and second alignment layer 23, 33 are respectively formed on the first and second electrode layers 22, 32 to define a filling space 40 therebetween.

The first alignment layer 23 has a plurality of first alignment regions 231 and a plurality of second alignment regions 232. The first alignment regions 231 extend respectively in a longitudinal direction (X), and are displaced from each other by a predetermined width (d) in a transverse direction (Y) relative to the longitudinal direction (X). The second alignment regions 232 extend respectively in the longitudinal direction (X), and are disposed to alternate the first alignment regions 231. The second alignment regions 232 have a different alignment pattern from that of the first alignment regions 231. Each of the first and second alignment regions 231, 232, has the predetermined width (d) in the transverse direction (Y), which is not greater than a half of the wavelength.

Similarly, the second alignment layer 33 has a plurality of first alignment regions 331 and a plurality of second alignment regions 332. The first alignment regions 331 extend respectively in the longitudinal direction (X), and are displaced from each other by the predetermined width (d) in the transverse direction (Y). The second alignment regions 332 extend respectively in the longitudinal direction (X), and are disposed to alternate the first alignment regions 331. The second alignment regions 332 have a different alignment pattern from that of the first alignment regions 331. Each of the first and second alignment regions 331, 332, has the predetermined width (d) in the transverse direction (Y), which is not greater than a half of the wavelength.

The first and second alignment layers 23, 33 may be made from any suitable and well-known materials.

In an embodiment shown in FIGS. 1 to 3, each of the first and second alignment regions 231, 232 of the first alignment layer 23 is in register with a corresponding one of the first and second alignment regions 331, 332 of the second alignment layer 33 in a direction (Z) of the normal line (N).

In an embodiment shown in FIGS. 1 to 3, each of first and second alignment regions 231, 232 of the first alignment layer 23 has an alignment direction substantially the same as that of the corresponding one of the first and second alignment regions 331, 332 of the second alignment layer 33. The alignment directions of the first and second alignment regions 331, 332 are shown by arrows in FIG. 3.

In other embodiments, each of first and second alignment regions 231, 232 of the first alignment layer 23 has an alignment direction different from that of the corresponding one of the first and second alignment regions 331, 332 of the second alignment layer 33 by a predetermined degree, e.g., +45°, −45°, 90°, 180°, etc.

The liquid crystal layer 4 has a plurality of liquid crystal elements 411 which are filled in the filling space 40 and which are aligned by the first and second alignment layers 23, 33 such that two adjacent ones of the liquid crystal elements 411 in the transverse direction (Y) are aligned respectively by two adjacent ones of the first and second alignment regions 231, 331, 232, 332 in two predetermined orientations which are orthogonal to each other, thereby permitting the phase modulation of the incident light to be independent of the polarization of the incident light.

In the case that each of the first and second alignment regions 231, 232, 331, 332, has the predetermined width (d) in the transverse direction (Y), which is not greater than a half of the wavelength of the incident light, the phases of the incident light can be modulated in an optically isotropic manner by using the polarization independent optical phase modulator of this disclosure.

Please note that each of the liquid crystal elements 411 may be a liquid crystal molecule or a plurality of liquid crystal molecules arranged in the same orientations. The liquid crystal molecules may be selected from nematic liquid crystals, sematic liquid crystals, cholesteric liquid crystals, etc.

When a voltage is applied between the first and second electrode layers 22, 32, the index of refraction of the liquid crystal layer 4 is varied. Each of the liquid crystal molecules has an optic axis determined by a director of the liquid crystal molecule. The directors of the molecules of the liquid crystal elements 411 are shown by arrows in FIGS. 1 and 2. A liquid crystal molecule has an ordinary refractive index ($n_o$) when the polarization of light is perpendicular to the optic axis, and an extraordinary refractive index ($n_e$) when the polarization of light is in the direction of the optic axis. In response to application of a voltage, directors of the liquid crystal elements 411 shown in FIGS. 1 and 2, which are originally in an X-Y plane, may be varied to be orientated in the direction (Z). In the meanwhile, in the case that the liquid crystal layer 4 is of a positive dielectric anisotropic material, the index of refraction of the liquid crystal layer 4 is reduced from $(n_e+n_o)/2$ to $n_o$, and the phase of the incident light is shifted accordingly. In the case that the liquid crystal layer 4 is of a negative dielectric anisotropic material, the index of refraction of the liquid crystal layer 4 is increased from $n_o$ to $(n_e+n_o)/2$.

Figure 4:
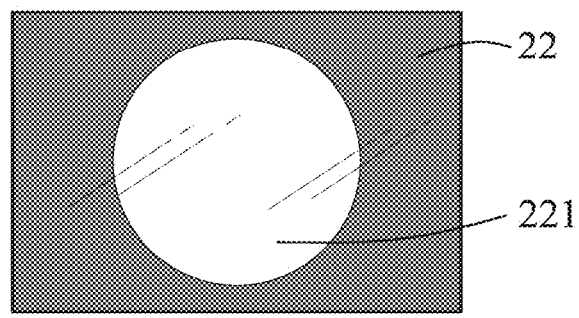
FIGS. 4 to 6 are schematic view illustrating various modifications which can be applied to a first electrode layer of the polarization independent optical phase modulator of FIG. 1.
Figure 5:
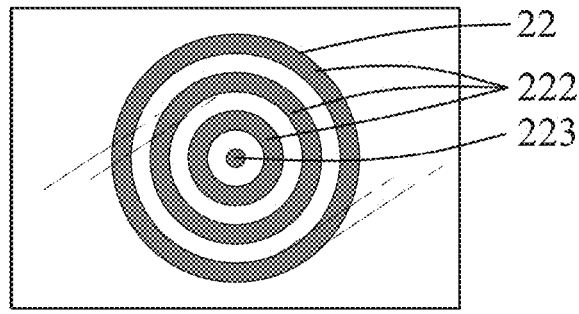
Figure 6:
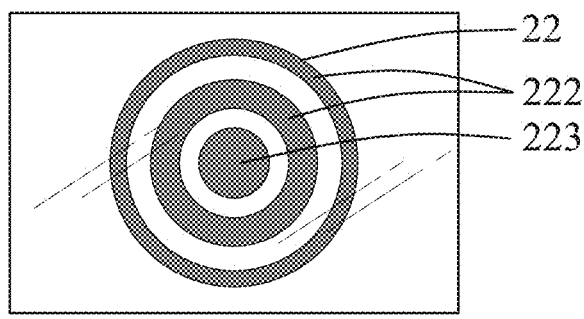

Referring to FIGS. 4 to 6, it can be noted that the first electrode layer 22 may be patterned so as to permit the polarization independent optical phase modulator of this disclosure to serve as a liquid crystal lens. Please note that although the first electrode layer 22 in FIGS. 4 to 6 is shown in gray for better illustration, the first electrode layer 22 is actually light-transmissive. When a voltage is applied between the first and second electrode layers 22, 32, a gradient electric field is created across the liquid crystal layer 4 so as to cause a gradient in the index of refraction of the liquid crystal layer 4.

In FIG. 4, the first electrode layer 22 has a central circular cut-out region 221.

In FIGS. 5 and 6, the first electrode layer 22 includes a plurality of ring electrodes 222 which are coaxially disposed. Each of the ring electrodes 222 is electrically insulated from adjacent neighboring one of the ring electrodes 222, and a central pad area 223 may be formed within the innermost one of the ring electrodes 222 to be electrically insulated from the innermost one of the ring electrodes 222.

Figure 7:
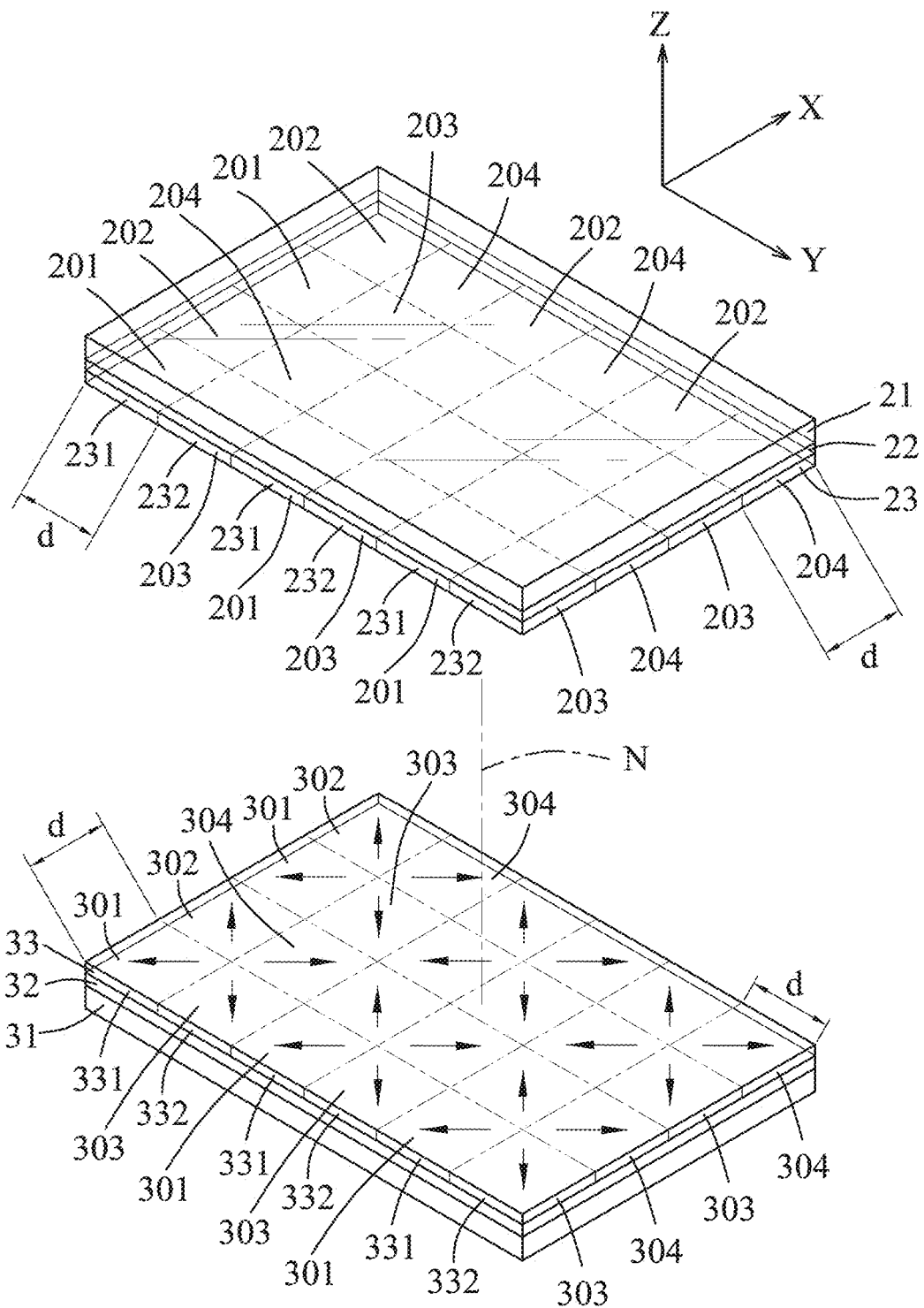
FIG. 7 is an exploded perspective view of a polarization independent optical phase modulator according to a second embodiment of the disclosure, in which a liquid crystal layer is omitted.

FIG. 7 illustrates a polarization independent optical phase modulator according to a second embodiment of the disclosure. The second embodiment is similar to the first embodiment except that in the second embodiment, each first alignment region 231 has a plurality of first areas 201 and a plurality of second areas 202. The second area 202 are disposed to alternate with the first areas 201 in the longitudinal direction (X), and have a different alignment pattern from that of the first areas 201.

Similarly, each second alignment region 232 has a plurality of first areas 203 and a plurality of second areas 204. The second area 204 are disposed to alternate with the first areas 203 in the longitudinal direction (X), and have a different alignment pattern from that of the first areas 203.

Each first alignment region 331 has a plurality of first areas 301 and a plurality of second areas 302. The second area 302 are disposed to alternate with the first areas 301 in the longitudinal direction (X), and have a different alignment pattern from that of the first areas 301.

Each second alignment region 332 has a plurality of first areas 303 and a plurality of second areas 304. The second area 304 are disposed to alternate with the first areas 303 in the longitudinal direction (X), and have a different alignment pattern from that of the first areas 303.

As such, two adjacent ones of the liquid crystal elements 411 in the longitudinal direction (X) are aligned respectively by two adjacent ones of the first and second areas 201, 203, 301, 303, 202, 204, 302, 304 in two predetermined orientations which are orthogonal to each other.

In an embodiment, as shown in FIG. 7, each of the first and second areas 201, 202, 203, 204 of the first and second alignment regions 231, 232 of the first alignment layer 23 is in register with a corresponding one of the first and second areas 301, 302, 303, 304 of the first and second alignment regions 331, 332 of the second alignment layer 33 in the direction (Z) of the normal line (N).

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A polarization independent optical phase modulator for phase modulation of an incident light having a wavelength, the polarization independent optical phase modulator comprising:

a first substrate and a second substrate which are spaced apart from each other along a line normal to the first and second substrates, at least one of the first and second substrates being light-transmissive;

a first electrode layer and a second electrode layer which are respectively formed on the first and second substrates;

a first alignment layer and a second alignment layer which are respectively formed on the first and second electrode layers to define a filling space therebetween, each of the first and second alignment layers having a plurality of first alignment regions which respectively extend in a longitudinal direction, and which are displaced from each other by a predetermined width in a transverse direction relative to the longitudinal direction, and a plurality of second alignment regions which respectively extend in the longitudinal direction, and which are disposed to alternate the first alignment regions, the second alignment regions having a different alignment pattern from that of the first alignment regions, each of the first and second alignment regions having the predetermined width in the transverse direction, which is not greater than a half of the wavelength; and a liquid crystal layer having a plurality of liquid crystal elements which are filled in the filling space and which are aligned by the first and second alignment layers such that two adjacent ones of the liquid crystal elements in the transverse direction are aligned respectively by two adjacent ones of the first and second alignment regions in two predetermined orientations which are orthogonal to each other, thereby permitting the phase modulation of the incident light to be independent of the polarization of the incident light.

2. The polarization independent optical phase modulator according to claim 1, wherein the first and second alignment regions of the first alignment layer are respectively in register with the first and second alignment regions of the second alignment layer in a direction of the normal line.

3. The polarization independent optical phase modulator according to claim 2, wherein each of the first and second alignment regions has a plurality of first areas, and a plurality of second areas which are disposed to alternate with the first areas in the longitudinal direction, and which have a different alignment pattern from that of the first areas such that two adjacent ones of the liquid crystal elements in the longitudinal direction are aligned respectively by two adjacent ones of the first and second areas in two predetermined orientations which are orthogonal to each other.

4. The polarization independent optical phase modulator according to claim 3, wherein each of the first and second areas of the first and second alignment regions of the first alignment layer is in register with a corresponding one of the first and second areas of the first and second alignment regions of the second alignment layer in the direction of the normal line.

5. The polarization independent optical phase modulator according to claim 1, wherein each of the first and second substrates is light-transmissive.

6. The polarization independent optical phase modulator according to claim 5, wherein the first electrode layer is patterned such that when a voltage is applied between the first and second electrode layers, a gradient electric field is created across the liquid crystal layer so as to cause a gradient in an index of refraction of the liquid crystal layer.

7. The polarization independent optical phase modulator according to claim 6, wherein the first electrode layer has a central circular cut-out region.

8. The polarization independent optical phase modulator according to claim 6, wherein the first electrode layer includes a plurality of ring electrodes which are coaxially disposed, each of the ring electrodes being electrically insulated from adjacent neighboring one of the ring electrodes.

* * * * *